United States Patent [19]

Breault

[11] Patent Number: 5,411,350
[45] Date of Patent: May 2, 1995

[54] QUICK CONNECT/DISCONNECT DEVICE, AND DISPENSING APPARATUS COMPRISING SAME

[75] Inventor: John P. Breault, New Britain, Conn.

[73] Assignee: Loctite Corporation, Hartford, Conn.

[21] Appl. No.: 147,220

[22] Filed: Nov. 3, 1993

[51] Int. Cl.6 ............................................. F16D 1/00
[52] U.S. Cl. .................................. 403/350; 222/309; 403/12; 403/13; 403/24; 403/315; 403/324; 403/348; 403/349; 403/341
[58] Field of Search ..................... 222/309; 239/600; 285/401, 913, 914; 403/12, 13, 14, 24, 25, 315, 319, 321, 322, 324, 341, 345, 348, 349, 350, 355, 356; 251/60, 61.2

[56] References Cited

U.S. PATENT DOCUMENTS

| | | | |
|---|---|---|---|
| 74,219 | 2/1868 | Hartwig | 403/348 X |
| 1,672,601 | 6/1928 | Brent | 403/350 |
| 2,329,198 | 9/1943 | Hattan et al. | 285/84 |
| 2,677,813 | 5/1954 | Sharp | 403/350 X |
| 2,942,900 | 6/1960 | Brucker | 403/350 |
| 3,370,144 | 2/1968 | Arthur et al. | 403/348 X |
| 3,781,040 | 12/1973 | Lasko et al. | 285/110 |
| 4,212,559 | 7/1980 | Persson | 403/348 |
| 4,664,252 | 5/1987 | Galbraith | 403/348 |
| 4,756,639 | 7/1988 | Hoshino | 403/297 |
| 4,858,789 | 8/1989 | Breault et al. | 222/309 |
| 4,917,525 | 4/1990 | Duncan | 403/349 X |
| 4,930,669 | 6/1990 | Dickau et al. | 222/309 |
| 4,953,756 | 9/1990 | Breault et al. | 403/348 X |
| 5,233,912 | 8/1993 | Mueller | 403/348 X |
| 5,255,827 | 10/1993 | Breault et al. | 403/341 X |
| 5,261,758 | 11/1993 | Vranish | 403/348 |

Primary Examiner—Eric K. Nicholson
Assistant Examiner—Andrea Chop
Attorney, Agent, or Firm—Steven J. Hultquist

[57] ABSTRACT

A matable connector assembly, suitable for use in fluid dispensing apparatus, comprising (1) a male connector comprising a housing defining an outer male coupling distal portion and having an axial bore containing therewithin an inner male coupling element which is axially bidirectionally slidable in the axial bore, the outer male coupling distal portion comprising transversely protruding tang element(s) thereon, and a manually securable locking member, and (2) a female connector comprising a housing defining a cavity therein, wherein the cavity contains an enclosing wall member defining a first cavity compartment therewithin, and a second cavity compartment exterior to the enclosing wall member within the cavity. The first cavity compartment is of a size and shape to couplingly receive the inner male coupling element therein. The second cavity compartment (i) is of a size and shape to couplingly receive the outer male coupling distal portion therein, (ii) has a rotary movement mechanical stop element therein, and (iii) has final coupling position securement means associated therewith.

20 Claims, 6 Drawing Sheets

QUICK CONNECT/DISCONNECT DEVICE, AND DISPENSING APPARATUS COMPRISING SAME

BACKGROUND OF THE INVENTION

1. Field of the Invention

The present invention generally relates to a matable connector assembly having a quick connect/disconnect character, and more specifically, in one embodiment thereof, to a dispensing apparatus comprising a connector assembly of such type.

2. Description of the Related Art

In the art of dispensing flowable media, various types of quick connect/disconnect fittings are utilized for connecting cables, lines, hoses, and the like to supply vessels containing the source volume of flowable media for the dispensing operation, and/or to dispensing devices, such as nozzles, injector heads, and other discharge means.

In such applications, rapid coupling and uncoupling of matable structures, with a minimum of manual effort and dexterity, is desired, particularly in high volume mass production operations where rapid change-out of coupled components is or may be required.

One such application involves dispensers for the pressurized delivery of flowable media such as sealants and adhesives. One class of sealants and adhesives in current widespread use is anaerobics, which reactively cure in the substantial absence of oxygen to yield a cured sealant or adhesive mass with superior strength and adhesion performance properties. These sealants and adhesives, however, can experience localized anoxic conditions in the flow passages, nozzles and dispensing heads by which they are selectively discharged, which cause them to cure and harden in the interior passages of the dispensing structure. Such "in situ" formation of cured material is of progressionary character, and ultimately may necessitate the change-out of the at least partially occluded dispensing structure and replacement thereof with a new dispensing structure.

A modular dispenser apparatus is described in U.S. Pat. No. 4,930,669 issued Jun. 5, 1990 to E. F. Dickau et al. for the dispensing of fluid media, in which an actuating unit and a dispensing unit are joined by a locking mechanism. A housing of the dispensing unit contains a ball-type valve mechanism, and defines a reservoir for containing the pressurized product to be dispensed. A diaphragm element is used in place of dynamic or shaft seals, and is of a non-sliding character to minimize the production of frictional heat which may facilitate the in-situ curing of heat-curable adhesives or sealants, and thereby render the dispensing unit deficient or even useless for its intended use. The diaphragm element also avoids the problem common to use of dynamic or shaft seals, of anaerobic compositions and cyanoacrylates being susceptible to curing due to surface ions and/or oxygen-deficient conditions which frequently exist in dispenser systems containing such seals. In the Dickau et al. apparatus, an O-ring-equipped end member of the dispensing unit is slidably received in a distal counterbore of the actuating unit, for coupling via an arrangement including circumferentially spaced set screws engaging an annular groove, and a male T-connector engaging a female slot. Subsequent rotation of the dispensing unit orients the T-connector, to permit coaction of the dispensing and actuating units and prevent their disengagement.

U.S. Pat. No. 2,329,198 issued to M. Hattan et al. describes an end fitting for a flexible hose, comprising an exteriorly threaded first fitting member having a hub carrying a locking screw groove, and a second interiorly threaded sleeve fitting member with a (reduced diameter) distal portion which is tapped to accommodate a screw element threaded therethrough and engaging the locking screw groove. The first and second fitting members are coaxially engageable with one another, to compressively secure an end portion of the hose therebetween.

U.S. Pat. No. 3,781,040 to Lasko et al. discloses a pipe joint seal for coupling aligned and adjacent pipe end portions, comprising an annular fitting member which is interiorly threaded at one end thereof to received a threaded pipe end section, and which features a plurality of radially aligned threaded holes at its other end in which set screws are disposed so that the screws engage the external abutment shoulders of another pipe. An annular resilient sealing ring is provided in the bore of the fitting, with an external annular flange engageable with the end of the second pipe section. The fitting has an annular internal shoulder engaged by the flange of the sealing ring, and the sealing ring has a cylindrical body portion extending axially on both sides of the flange and engageable with the bores of the fitting and the second pipe section. By this arrangement, internal fluid pressures on the sealing ring causes radial expansion of the sealing ring so that it engages the bores.

In general, there is widespread industrial use of fluid dispensers in time-critical manufacturing operations. In these applications, when either the actuator or dispenser portion of the dispenser becomes inoperable, it is necessary to locate and use the correct tool to disconnect one of such portions from the other, or else to replace the entire dispensing assembly.

Further, if the dispensing structure is coupled to a hose which in turn is coupled to a supply vessel, and it is necessary to switch the hose/dispensing structure subassembly to a new supply vessel after the original vessel is depleted of feed material, the hose bearing the dispensing structure must be disconnected from the original supply vessel and then connected to the new supply vessel, and tools typically are required for such change-out. This change-out of supply vessels correspondingly involves significant down-time in the manufacturing operation, to accommodate the supply vessel replacement.

Accordingly, it would be a significant advance in the art to provide a connection structure which is applicable to dispenser apparatus comprising actuator and dispenser portions, permitting such portions to be quickly connected to and disconnected from one another, without the use of any tools whatsoever.

It therefore is an object of the present invention to provide such a connection structure of quick connect/disconnect character, requiring no tools to effect connection or disconnection.

It is another object of the present invention to provide a dispensing apparatus incorporating such connection structure.

Other objects and advantages of the invention will be more fully apparent from the ensuing disclosure and appended claims.

SUMMARY OF THE INVENTION

The present invention relates broadly to a coupling structure as hereinafter more fully described.

In one specific aspect, the present invention relates to a matable connector assembly, comprising:

a male connector comprising a housing defining an outer male coupling distal portion and having an axial bore containing therewithin an inner male coupling element which is axially bidirectionally slidable in the axial bore, and means for maintaining said inner male coupling element in selected alignment during coupling of the male connector and female connector, said outer male coupling distal portion comprising transversely protruding tang element(s) thereon, and a manually securable locking member, such as a manually securable circumscribing locking ring;

a female connector comprising a housing defining a cavity therein, wherein the cavity contains an enclosing wall member defining a first cavity compartment therewithin, and a second cavity compartment exterior to the enclosing wall member within the cavity, said first cavity compartment being of a size and shape to couplingly receive said inner male coupling element therein, and said second cavity compartment (i) being of a size and shape to couplingly receive said outer male coupling distal portion therein, (ii) including guide/stop means for aligning the male and female connectors during coupling thereof and upon insertion of the male connector into the female connector limiting the rotation of the male connector relative to the female connector, e.g., an axially extending positioning pin in the second cavity compartment as such guide/stop means, and (iii) including means for securing the male connector in the female connector in a final coupled position, e.g., radially extending nesting pin(s) extending through the female connector housing into the second cavity compartment;

the male connector and female connector being engageably positionable with the inner male coupling element axially inserted into the first cavity compartment, and the outer male coupling distal portion axially inserted into the second cavity compartment, so that upon subsequent rotation of the male connector relative to the female connector, the tang element engages the positioning pin, to permit the manually securable locking member to be manually secured to abuttingly engage the tang element(s) and the means for securing the male connector in the female connector in a final coupled position.

In another aspect, the present invention relates to a dispenser assembly for application of fluid material to a selected application locus, comprising an actuator section and a dispenser section which are interconnectible to one another by means of the above-described matable connector assembly structure, wherein the actuator section embodies the structure of one of the above-described male and female connectors, e.g., the female connector, and the dispenser section embodies the structure of the other one of the above-described male and female connectors, e.g., the male connector.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Although the quick connect/disconnect mechanism of the present invention will be illustratively described hereinafter as embodied in fluid dispenser apparatus of a general type as more fully disclosed and claimed in commonly assigned U.S. Pat. Nos. 4,930,669 and 4,858,789, the disclosures of which hereby is incorporated herein by reference, it will be recognized that the utility of the quick connect/disconnect mechanism of the present invention is not thus limited, but rather extends to any suitable applications in which structural elements or members are to be mechanically coupled for coaction or conjoint use.

Examples of such other use systems in which the quick connect/disconnect mechanism of the present invention may be employed include the following structural coupled (sub)assemblies:

(i) (oxyacetylene cutting torch head and associated gas hose)/(gas cylinder valve head or regulator);
(ii) (paint spray gun)/(air compressor);
(iii) (trailer hitch)/(vehicular mounting plate);
(iv) (computer system CPUs)/(computer system peripherals);
(v) (cameras)/(tripod units);
(vi) garden hoses;
(vii) fire hoses;
(viii) tent support structures including coupleable poles and struts; etc.

Figure 1:
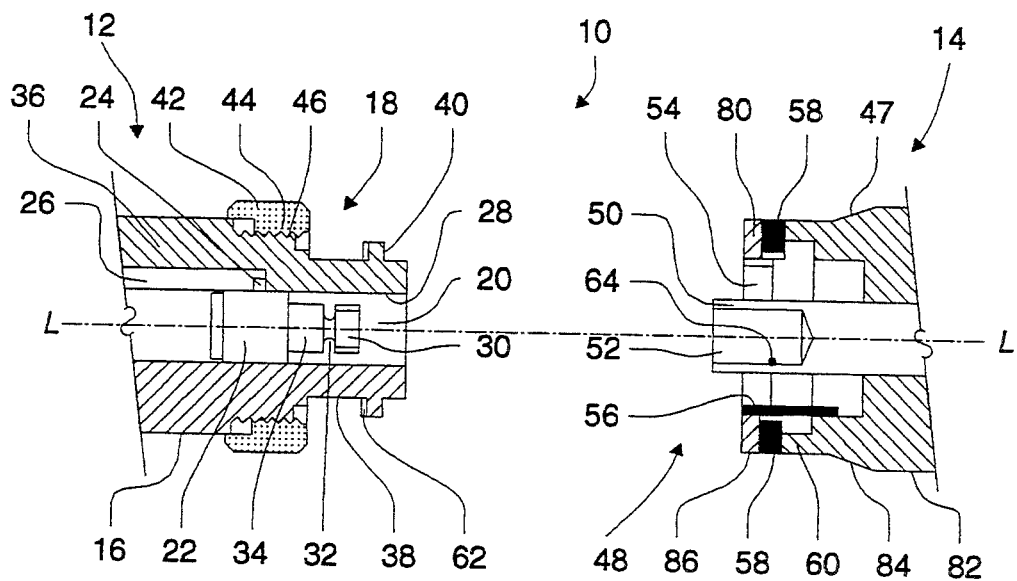
FIG. 1 is a side elevation sectional view of a coupling assembly according to one embodiment of the present invention, wherein the male and female connector portions are shown in axially spaced-apart relationship to one another.

Referring now to the drawings, FIG. 1 is a side elevation sectional view of a coupling assembly 10 according to one embodiment of the present invention, wherein the male and female connector portions 12 and 14, respectively, are shown in axially spaced-apart relationship to one another, as coaxially aligned along longitudinal axis L—L for mating. Mating of these structures is effected by oppposedly translating the male and/or female connector portions along axis L—L into engagement with one another.

The male connector portion 12 comprises a housing 16 which may for example be formed of die-cast aluminum or any other suitable material of construction. The housing is shaped so as to define an outer male coupling distal portion 18 and the housing has an axial bore 20 containing therewithin an inner male coupling element 22 which is axially bidirectionally slidable in the axial bore along a travel path whose length may be selectively varied (by adjustment means not shown in FIG. 1, but hereinafter more fully described). For this purpose, the inner male coupling element is provided on its proximal part with a radially projecting tine 24 disposed in channel 26 extending longitudinally (axially) along the inner wall 28 of the axial bore 20, as shown. The radially projecting tine 24 and channel 26 serve to prevent rotation of the inner male coupling element 22 in the axial bore 20, so that the inner male coupling element is presented in proper orientation during the coupling operation. It will be appreciated that other suitable means may be employed for maintaining the inner male coupling element in selected alignment during coupling of the male connector and female connector.

The term "distal" as used herein refers to the forward part or segment of the male connector, and the term "proximal" refers to the trailing or rearward part or segment of the male connector, in application to the male connector's orientation when it is in close proximity to the female connector for coupling therewith. Applying this convention in the terminology used herein, as the male connector is brought into coupling engagement with the female connector, the distal end of the male connector first contacts the proximal part of the female connector, and then slides distally forwardly, to effect innermost penetration of the female connector by the male connector.

At its distal extremity, the inner male coupling element 22 is provided with an engagement head 30 mounted on stem 32, with the stem 32 in turn being joined to the main body portion 34 of the inner male coupling element 22.

The outer male distal portion 18 of the male connector is of reduced transverse outer diameter in relation to the transverse outer diameter of the main body portion 36. The outer male coupling distal portion 18 comprises on its exterior surface 38 one or more transversely protruding tang elements 40 thereon, e.g., diametrally opposite tang elements, and the housing of the male connector is circumscribed on its outer surface by a manually securable locking member 42.

The manually securable locking member 42 is threaded on its interior surface with threading 44, and such threading is threadably engaged with complementarily formed threading 46 on the exterior surface of the housing. This mated threading arrangement permits the locking member 42, e.g., a locking ring in the specific embodiment illustrated, to be selectively manually tightened by translation in the proximal direction (as the locking member is manually circumferentially rotated about the male connector housing), so that after engagement of the male connector 12 with the female connector 14, such tightening and proximal translation of the locking member causes the male connector to tightly compressively and lockingly abut against the female connector. In place of the locking ring 42, any other manually securable locking member of suitable structure and operation may be employed, which is manually securable to engage the male and female connector securely in the final coupled position.

The female connector 14 as shown comprises a housing 47 defining a cavity 48 therein, wherein the cavity contains an enclosing wall member 50 defining a first cavity compartment 52 therewithin, and a second cavity compartment 54 exterior to the enclosing wall member 50 within the cavity 48. The first cavity compartment 52 is of a size and shape to couplingly receive the distal section of the inner male coupling element 22 therein. In a specific embodiment applicable to fluid dispenser assembly systems, the enclosing wall member 50 may be axially translatable, when coupled with actuation means of an actuator assembly, as hereinafter more fully described.

For this purpose, the enclosing wall member 50 of the first cavity compartment 52 may be provided with a transverse pin 64 for matable engagement with the slot defined by the stem 32 of the inner male coupling element, together with the inner facing surfaces of the engagement head 30 and the main body portion 34 of the inner male coupling element 22. In place of the transverse pin 64, any other suitable structure, e.g., an integrally formed protrusion or stub element in the interior volume at the inlet end of enclosing wall member 50, may be utilized in the first cavity compartment 52 for lockingly engaging the engagement head 30.

The engagement head 30 for the purpose of securing engagement may have a partial cylindrical shape with a flat (chordal) side edge, so that upon suitable rotation of the male connector 12, the inner male coupling element and its engagement head 30 are correspondingly rotated into position for passing distally over transverse pin 64, following which rotation by 90° brings the engagement head 30 into "secured" position behind (distally of) the transverse pin, while concurrently, the tang 40 engages the positioning pin 56, which acts as a limit stop means for the rotation of the male connector 12 relative to the female connector 14. At this limit stopped position determined by the positioning pin 56, the nesting pins 58 engage the grooves 62 in the tang elements 40 of the male connector, and the locking member may be rotationally proximally translated, to draw the female connector into tightened engagement with the male connector. In place of the axially extending positioning pin, the female connector may be provided in the second cavity compartment with any other suitable guide/stop means for aligning the male and female connectors during coupling thereof and upon insertion of the male connector into the female connector limiting the rotation of the male connector relative to the female connector. In place of the nesting pins 58, the female connector may be provided with any other means for securing the male connector in the female connector in a final coupled position.

Thus, the second cavity compartment 54 (i) is of a size and shape to couplingly receive the outer male coupling distal portion 18 therein, (ii) has guide/stop means for aligning the male and female connectors during coupling thereof and upon insertion of the male connector into the female connector, limiting the rotation of the male connector relative to the female connector, e.g., an axially extending positioning pin 56 therein, and (iii) has means for securing the male connector in the female connector in a final coupled position, e.g., a radially extending nesting pin at diametrally opposite segments of the housing wall 60 which circumscribes and bounds the second cavity compartment 54. The nesting pins each extend through the female connector housing wall to the second cavity compartment, and may suitably be provided at their respective radially inner extremities with a spring-biased ball or detent element, to assist in securing the male connector in position in the female connector, by means of complementarily mating engagement structure of the male connector, comprising grooves 62 in the transversely protruding tang elements 40 at the top and bottom surfaces of the outer male coupling distal portion 18, as shown more clearly in the side elevation view of FIG. 3, wherein the male connector 12 has been rotated by 90° relative to the position shown in FIG. 1.

In use, the male connector and female connector shown in FIG. 1 are engageably positionable, with the inner male coupling element 22 axially inserted into the first cavity compartment 52, and the outer male coupling distal portion 18 axially inserted into the second cavity compartment 54. Upon subsequent rotation of the male connector relative to the female connector, the tang element 40 engages the positioning pin 56, to thereupon permit the manually securable locking member 42 to be manually secured (by manually rotating the locking member 42 over the threaded surface of the male connector housing) to draw the female connector 14 into proximity with the male connector, while abuttingly engaging the tang elements with the nesting pins, so that the male and female connectors are abuttingly interconnected with one another.

Figure 2:
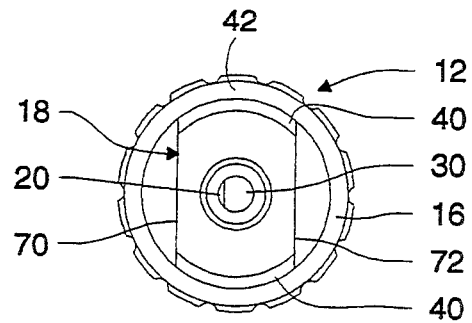
FIG. 2 is an end elevation view of the distal end of the male connector portion of the coupling assembly of FIG. 1.

FIG. 2 is an end elevation view of the male connector 12 of FIG. 1, showing the shape of the engagement head 30 disposed in bore 20. The tang elements 40 extend outwardly at the top and bottom regions of the outer male coupling distal portion 18. The outer male coupling distal portion 18 is generally coextensive in transverse extent with the tang elements 40, and has flat side surfaces 70 and 72 at the side margins of the distal portion 18, as illustrated in FIG. 2. The housing 16 of the male connector, as shown, has the locking member 42 circumscribingly mounted thereon.

Preferably, in the connector of the present invention, the housings of each of the male connector and the female connector have a generally cylindrical shape. Correspondingly, the axial bore of the male connector may suitably have a circular transverse cross-section, and the enclosing wall of the female connector may advantageously be of cylindrical shape, with the second cavity compartment being of cylindrical annular shape. Other shapes and geometric orientations may likewise be employed, of non-cylindrical character, as appropriate to the end use application of the connector.

Although the foregoing description of the illustrative matable connector assembly according to invention features a male connector housing comprising an exterior surface portion having engagement threading thereon, wherein the manually securable locking member of the male connector comprises a cylindrical locking ring which is threadably engageable with the engagement threading on the exterior surface portion of the male connector housing, and manually tightenable into abutting contact with the female connector to tensionally/compressively interlock the male and female connectors, it will nonetheless be recognized that other locking means and structure may be employed to maintain draw the male and female connectors together in secured abutting relationship with one another.

Figure 3:
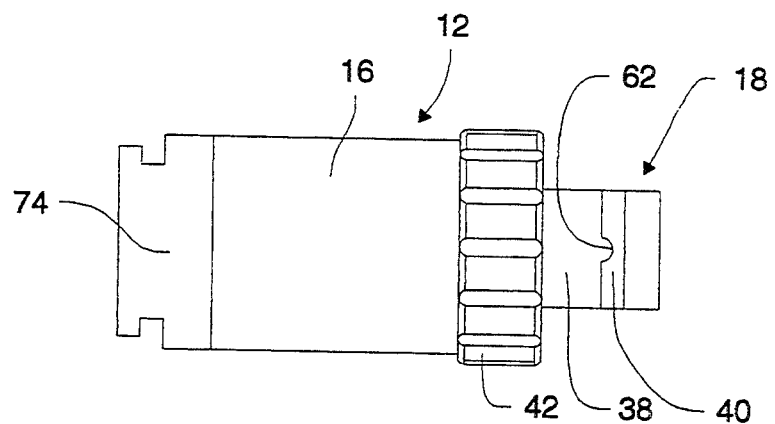
FIG. 3 is a side elevation view of the male connector portion of the coupling assembly of FIG. 1, as rotated 90° from the position shown in FIG. 1.

FIG. 3 is a side elevation view of a male connector 12 of the type partially shown in FIG. 1. The housing 16 at its proximal end is mechanically secured (by means, e.g., mechanical fasteners, not shown) to the nozzle engagement fitting 74 by means of which the male connector is usefully employed for dispensing of fluid in a fluid dispenser assembly, as hereinafter more fully described. At its distal end 18, the male connector features the tang element 40 mounted or integrally formed on the distal end surface 38. The tang element 40 is provided on its proximal side surface with a groove 62 for engaging the nesting pins when the male and female connectors are matingly engaged with one another. Locking member 42 is provided on the male connector as shown, and in use is translated distally away from the dispenser section when the male and female connector portions are coupled, so as to draw the section into abuttingly engagement with the dispenser section, by means of the engagement head 30 being secured by the transverse pin 64, by the nesting pins 58 engaging the tang elements 40, and by the tang elements being held in locked position by the proximal flange segments 80 of the female connector 14. The proximal flange segments 80 each extend partially circumferentially around the inlet region of the cavity 48 of the female connector as shown.

Figure 4:
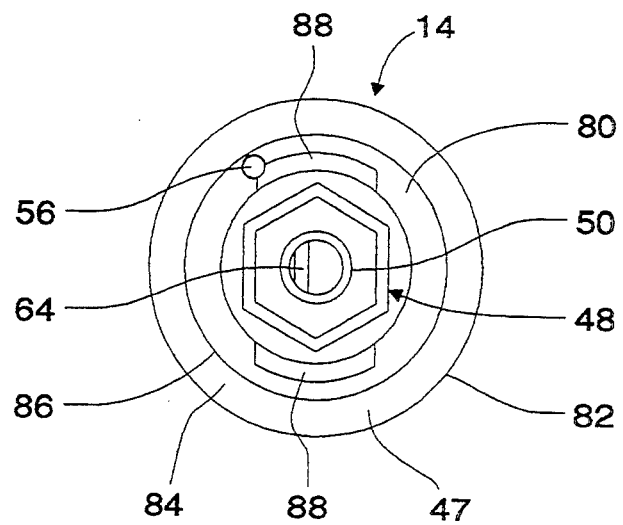
FIG. 4 is an end elevation view of the proximal end of the female connector portion of the coupling assembly of FIG. 1.

FIG. 4 is an end elevation view of the proximal end of the female connector portion 14 of the coupling assembly 10 of FIG. 1. As shown in FIGS. 1 and 4, the female connector 14 comprises a housing 47 which includes a main cylindrical body portion 82 of relatively larger diameter and cross-sectional area, a transitional frusto-conical portion 84 of progressively smaller cross-sectional area in the proximal direction of the female connector, and a proximal inlet portion 86 of relatively smaller diameter and cross-sectional area character.

Figure 5:
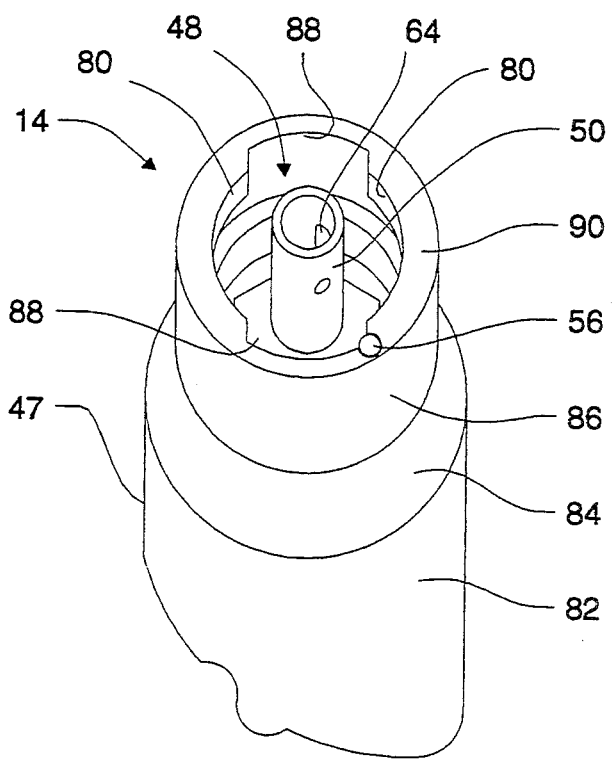
FIG. 5 is a perspective view of a part of the proximal end structure of the female connector portion of the coupling assembly of FIG. 1.

FIG. 5 is a perspective view of a part of the proximal end structure of the female connector portion of the coupling assembly of FIGS. 1 and 4. As illustrated, the proximal inlet portion 86 terminates at a flat proximal face 90, which includes radially inwardly extending flange segments 80 diametrally opposite one another, along sides of the inlet opening of cavity 48, and cutouts 88. The transverse pin 64 is mounted in the upper part of cylindrical wall 50 as shown.

Figure 6:
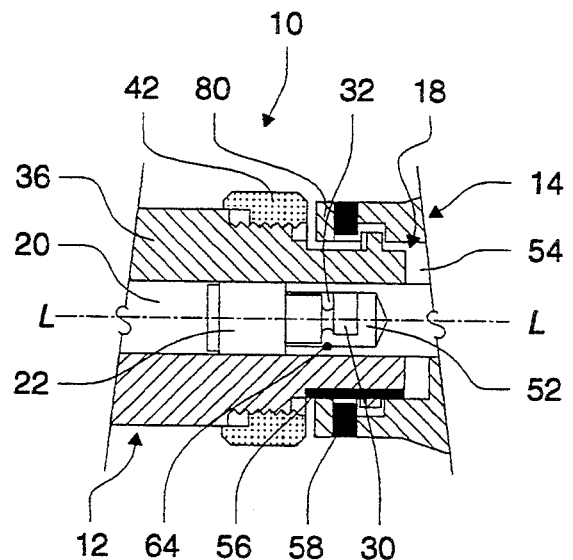
FIG. 6 is a side elevation sectional view of the male and female connector portions illustrated in the FIG. 1 connector assembly, shown in initial engaged relationship with one another.

FIG. 6 is a side elevation sectional view of the male and female connector portions illustrated in the FIG. 1 connector assembly 10, shown in initial engaged relationship with one another. The male connector 12 and the female connector 14 have been brought into axial engagement along centerline L—L, with the inner male coupling element 22 being advanced into the first cavity compartment 52, and with the male connector 12 being rotated about the central axis L—L by a displacement of 90° relative to the position shown in FIG. 1. In such circumferentially rotated position of FIG. 6, the inner male coupling element 22 has the engagement head 30 positioned so that the engagement head "clears" the transverse pin 64 mounted in the cylindrical wall member 50. The inner male coupling element 22 is provided on its proximal part with a radially projecting tine 24 disposed in channel 26, and by this arrangement, the inner male coupling element is oriented properly for insertion into the first cavity compartment 52, as shown in FIG. 7.

Concurrently, the outer male coupling distal portion 18 is advanced into the second cavity compartment 54, so that as the male connector is brought into coupling engagement with the female connector, the distal end of the male connector first contacts the proximal part of the female connector, and then slides distally forwardly to a position of innermost penetration of the female connector by the male connector.

Figure 7:
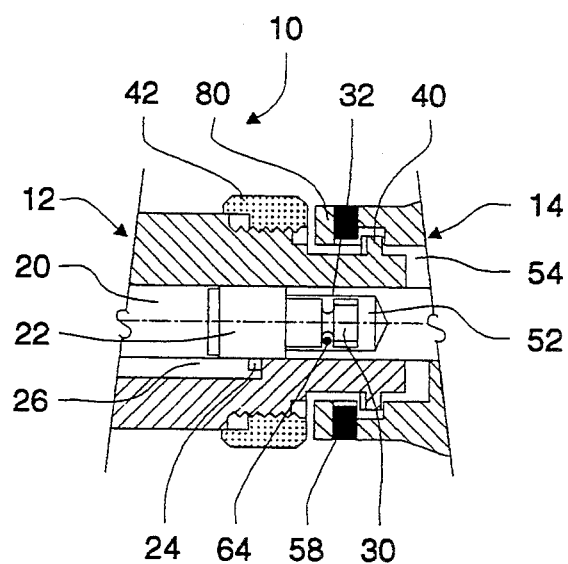
FIG. 7 is a side elevation sectional view of the FIG. 6 connector assembly, in which the male connector portion has been rotated from the position shown in FIG. 6, until the tang element of the male connector portion has contacted the positioning pin of the female connector portion.

FIG. 7 is a side elevation sectional view of the FIG. 6 connector assembly, in which the male connector portion has been rotated from the position shown in FIG. 6, until (1) one of the tang elements 40 has contacted the positioning pin 56, (2) the tang elements are positioned interiorly of the flange segments 80, (3) the slot 32 has mated with the transverse pin 64, and (4) the nesting pins 58 of the female connector portion 14 have contacted the grooves 62 of the tang elements 40 of the male connector portion 12. Following this matable engagement of the male and female connector portions, the connector assembly 10 is ready for final manual lock tightening of the locking ring 42.

Figure 8:
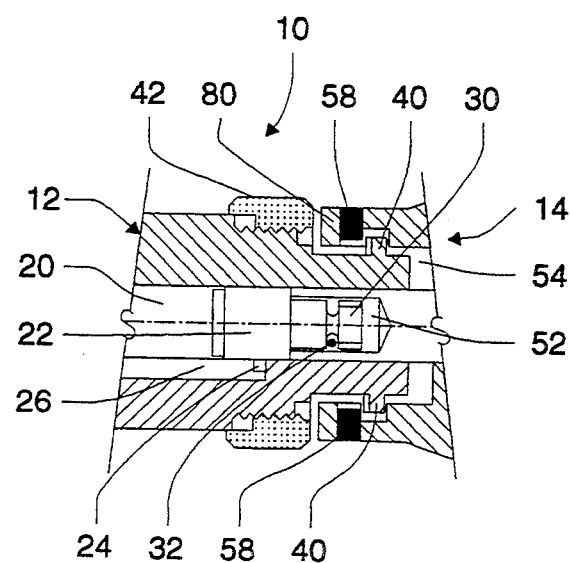
FIG. 8 is a side elevation sectional view of the FIG. 6 connector assembly, in which the locking ring of the male connector portion is shown in tightened position against the outer female connection structure, with the tang elements of the male connector portion in contact with the nesting pins of the female connector portion.

FIG. 8 is a side elevation sectional view of the FIG. 6 connector assembly 10, in which the locking ring 42 of the male connector portion 12 is shown in tightened position against the outer female connector 14, with the tang elements 40 of the male connector portion 12 in contact with the nesting pins 58 of the female connector portion 14. The tightening of the locking ring 42 is effected by manually rotating the locking ring over the exterior surface of the male connector portion, to thereby proximally translate the male connector portion, and, via the intercoupled engagement head/slot, tang/flange segment and tang/pin structures, the female connector portion is drawn into mechanical engagement with the male connector portion, with the distal flat surface of the locking ring abuttingly and compressively engaging the flat proximal face 90 of the female connector member.

Figure 9:
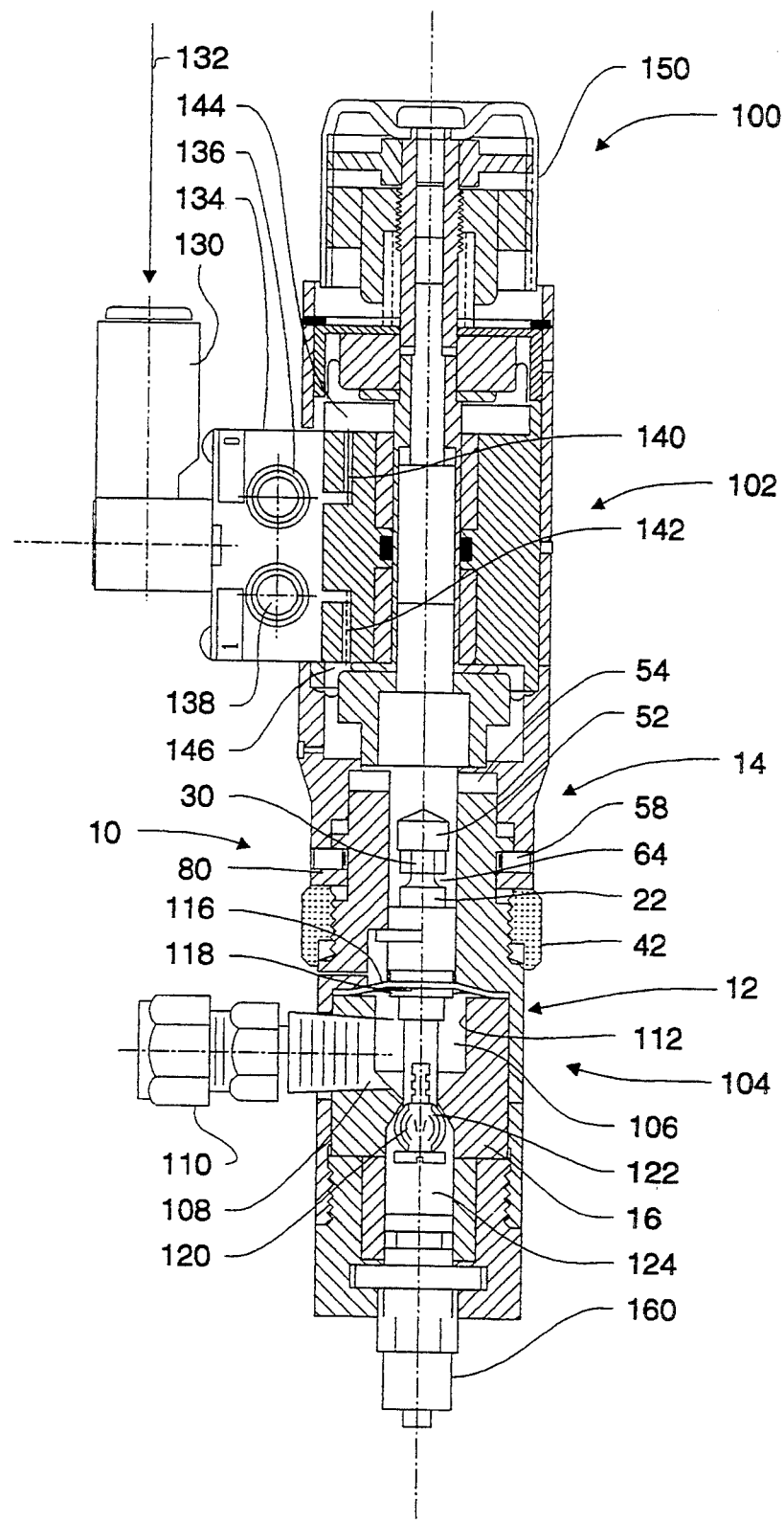
FIG. 9 is a side elevation sectional view of a fluid dispenser apparatus accordingly to one embodiment of the present invention, comprising an actuator portion and a dispenser (valve) portion, in engagement with one another.

FIG. 9 is a side elevation sectional view of a fluid dispenser apparatus 100 according to one embodiment of the present invention, comprising an actuator portion 102 and a dispenser (pressure-time valve) portion 104, in engagement with one another. The fluid dispenser apparatus 100 is of a general type as disclosed and operatively described in the aforementioned and commonly assigned U.S. Pat. No. 4,930,669, the disclosure of which hereby is incorporated herein by reference, and therefore the ensuing discussion of this embodiment of the present invention will be specifically directed to the quick connect/disconnect features of this embodiment, and only generally refer to the other structural aspects and features of the dispenser apparatus.

The fluid dispenser apparatus 100 is of a type suitable for dispensing a broad range of fluid products, as for example anaerobic sealants and cyanoacrylate adhesives.

The elements of the coupling mechanism in FIG. 9, as well as in FIG. 10, as hereinafter described are correspondingly numbered to FIGS. 1–8.

The dispenser portion 104 comprises a fluid reservoir 106 communicating with a feed inlet 108. The feed inlet 108 may be suitably threaded for threadable engagement with a fitting 110, by means of which the inlet may be joined in closed flow communication with a source of pressurized fluid medium to be ultimately dispensed by the dispenser apparatus 100.

The fluid reservoir 106 is bounded by wall surfaces 112 of the housing 16 of the male portion 12 of the connector assembly associated with apparatus 100. The fluid reservoir 106 also is bounded by diaphragm element 116 of a diaphragm valve assembly comprising valve stem 118 on which the diaphragm element 116 and the ball valve 120 are mounted, so that when the valve stem 118 is axially downwardly translated, the ball valve 120 is downwardly displaced from the sealing surface 122 of the discharge passage 124, so that fluid is thereupon dispensed from a suitable nozzle 160.

The actuator portion 102 is rigidly connected to dispenser portion 104 by means of connector assembly 10, as hereinabove described in connection with FIGS. 1–8 hereof.

The actuator portion 102 features a pressurized gas inlet conduit 130 which is joined by suitable means (not shown) to a source of pressurized gas which is introduced to conduit 130 in the direction indicated by arrow 132.

The pressurized gas entering conduit 130 flows to a flow-directing valve assembly 134 having associated valve mechanisms 136 and 138, to direct flow into gas flow passage 140 when the associated valve mechanism 136 is open and the valve mechanism 138 is closed, or alternatively into gas flow passage 142 when valve mechanism 138 is open and valve mechanism 136 is closed.

When pressurized feed gas is flowed preferentially through gas flow passage 140 when valve mechanism 138 is closed and valve mechanism 136 is open, the pressurized gas enters plenum space 144 and exerts fluid pressure which causes upward translation of the valve stem 118, through a piston assembly coupled therewith. In like manner, when the valve mechanism 136 is closed and the valve mechanism 138 is open, pressurized gas introduced to conduit 130 flows through gas flow passage 142 into plenum space 146 and exerts fluid pressure causing the valve stem 118 coupled to the actuator piston assembly to be downwardly translated.

By this arrangement, the valve stem 118 is selectively axially translatable to cause the ball valve element 120 to be translated away from the sealing surface 122, to effect dispensing of the fluid medium from the dispenser. Subsequently, retraction of the valve stem 118 causes the ball valve element 120 to return to sealing engagement against the sealing surface 122, to effect cessation of fluid flow from the dispenser.

To control the duration of the dispensing operation, the valve mechanisms 136 and 138 may be automatically controlled via valve actuators coupled in signal transmission and controlled relationship to a suitable computer or microprocessor system (not shown). The dispensing of the fluid medium will also be affected by the pressure level and viscosity characteristics of the fluid medium.

The stroke of the valve stem 118 may also be selectively adjusted by the adjustment unit 150 which is secured to the actuator portion 102 at an upper extremity thereof. The operation of the actuator portion 102 and adjustment unit 150, and their appertaining structure, are of a type as more fully described in the aforementioned U.S. Pat. No. 4,930,669.

Figure 10:
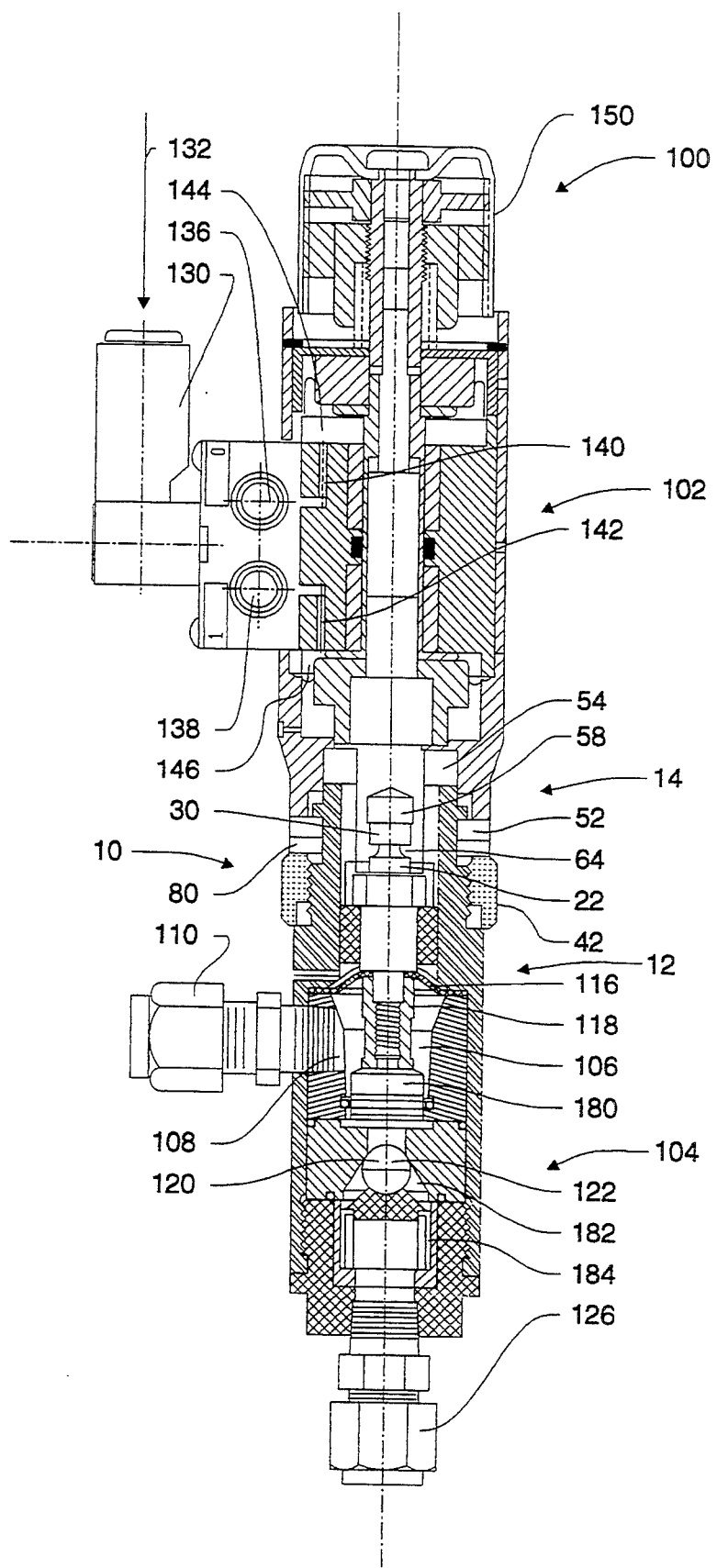
FIG. 10 is a side elevation sectional view of a positive displacement pump dispenser device according to another embodiment of the present invention.

FIG. 10 is a side elevation sectional view of a positive displacement pump dispenser apparatus according to another embodiment of the present invention, of a general type as disclosed and claimed in U.S. Pat. No. 4,858,789 issued Aug. 22, 1989 to John P. Breault, et al., commonly assigned, the disclosure of which hereby is incorporated herein by reference in its entirety. The dispenser apparatus shown in FIG. 10 is numbered correspondingly, in respect of the same or corresponding elements, to FIG. 9. In the FIG. 10 embodiment, the valve stem 118, coupled to the actuator portion 102 by interior coupling means including the inner connector structure of connector assembly 10, has a piston 180 secured to the lower extremity of the valve stem. The ball valve element 120 is disposed in dispensing chamber 182 and is maintained in closed position against the sealing surface 122, by means including a spring element 184 biasing the ball valve element 120 to the sealed position illustrated in FIG. 10.

In this positive displacement pump apparatus, the actuator portion 102 serves to downwardly translate the piston 180, to dispense fluid from fluid reservoir 106 by pressure displacement of ball valve element 120 from its spring-biased closed position, so that the fluid medium is flowed into passage 182 for discharge from the dispenser through discharge fitting 126, which may be coupled with suitable conduit or other end use means. Subsequent to dispensing of the fluid, the piston 180 is retracted by valve stem 118, allowing the ball valve element 120 to be urged into engagement with the sealing surface 122, under the force exerted by the spring element 184.

While the invention has been described herein with reference to specific features, aspects and embodiments, it will be recognized that various alternative embodiments, modifications and variations are possible, and the invention as claimed therefore is to be broadly construed in respect of such alternative embodiments, modifications and variations, as regards the spirit and scope of the present invention.

What is claimed is:

1. A matable connector assembly, comprising:
   a male connector comprising a housing defining an outer male coupling distal portion and having an axial bore containing therewithin an inner male coupling element which is axially bidirectionally slidable in the axial bore, and means for maintaining said inner male coupling element in selected alignment during coupling of the male connector and female connector, said outer male coupling distal portion comprising at least one transversely protruding tang element thereon, and a manually securable locking member; and
   a female connector comprising a housing defining a cavity therein, wherein the cavity contains an enclosing wall member defining a first cavity compartment therewithin, and a second cavity compartment exterior to the enclosing wall member within the cavity, said first cavity compartment being of a size and shape to couplingly receive said inner male coupling element therein, and said second cavity compartment (i) being of a size and shape to couplingly receive said outer male coupling distal portion therein, (ii) including guide stop means for alignment of the male and female connectors during coupling thereof, and upon insertion of the male connector into the female connector, limiting the rotation of the male connector relative to the female connector, and (iii) including means for securing the male connector in the female connector in a final coupled position;
   the male connector and female connector being engageably positionable with the inner male coupling element axially inserted into the first cavity compartment, and the outer male coupling distal portion axially inserted into the second cavity compartment, so that upon subsequent rotation of the male connector relative to the female connector, the at least one tang element engages the means for securing the male connector in the female connector in a final coupled position, to permit the manually securable locking member to be manually secured to abuttingly engage the at least one tang element and the means for securing the male connector in the female connector in a final coupled position.

2. A matable connector assembly according to claim 1, wherein the housing of each of the male connector and the female connector have a generally cylindrical shape.

3. A matable connector assembly according to claim 2, wherein the axial bore of the male connector has a circular transverse cross-section, the enclosing wall member of the female connector is of cylindrical shape, and the second cavity compartment is of cylindrical annular shape.

4. A matable connector assembly according to claim 1, wherein the guide stop means comprises an axially extending positioning pin in the second cavity compartment.

5. A matable connector assembly according to claim 1, wherein the male connector housing comprises an exterior surface portion having engagement threading thereon, and wherein the manually securable locking member of the male connector comprises a cylindrical locking ring which is threadably engageable with the engagement threading on the exterior surface portion of the male connector housing, and manually tightenable into abutting contact with the female connector to interlockingly connect the male and female connectors.

6. A matable connector assembly according to claim 1, wherein the means for securing the male connector in the female connector in a final coupled position comprises a radially extending nesting pin extending through the female connector housing into the second cavity compartment.

7. A matable connector assembly according to claim 6, wherein the second cavity compartment at a proximal extremity of the female connector is bounded by diametrally opposite flange segments extending along sides of the cavity, forming a transverse inlet opening through which the outer male coupling distal portion may be passed and subsequently rotated in relation to the female connector to interiorly lock the at least one tang element by the flange segments.

8. A matable connector assembly according to claim 7, wherein the outer male coupling distal portion is manually secured to abuttingly engage the at least one tang element and the nesting pin, at an angular rotation of 90° from the angular position of the male connector in relation to the female connector which accommodates axial insertion of the inner male coupling element into the first cavity compartment and axial insertion of the outer male coupling distal portion into the second cavity compartment.

9. A matable connector assembly according to claim 1, further comprising guide structure on the inner male coupling element, and a channel cooperatively matable with said guide structure along the axial bore of the male connector housing.

10. A matable connector assembly, comprising:

a male connector comprising a housing defining an outer male coupling distal portion and having an axial bore containing therewithin an inner male coupling element which is axially bidirectionally slidable in the axial bore, and means for maintaining said inner male coupling element in selected alignment during coupling of the male connector and female connector, said outer male coupling distal portion comprising at least one transversely protruding tang element thereon, and a manually securable locking member; and a female connector comprising a housing defining a cavity therein, wherein the cavity contains an enclosing wall member defining a first cavity compartment therewithin, and a second cavity compartment exterior to the enclosing wall member within the cavity, said first cavity compartment being of a size and shape to couplingly receive said inner male coupling element therein, and said second cavity compartment (i) being of a size and shape to couplingly receive said outer male coupling distal portion therein, (ii) having an axially extending positioning pin therein, and (iii) having a radially extending nesting pin extending through the female connector housing thereinto;

the male connector and female connector being engageably positionable with the inner male coupling element axially inserted into the first cavity compartment, and the outer male coupling distal portion axially inserted into the second cavity compartment, so that upon subsequent rotation of the male connector relative to the female connector, the at least one tang element engages the positioning pin, to permit the manually securable locking member to be manually secured to abuttingly engage the at least one tang element and the nesting pin.

11. A dispenser assembly for application of fluid material to a selected application locus, comprising an actuator section and a dispenser section which are interconnectible to one another by a matable connector assembly structure, wherein the actuator section comprises a first connector portion and the dispenser section comprises a second connector portion, said first and second connector portions comprising:

a male connector comprising a housing defining an outer male coupling distal portion and having an axial bore containing therewithin an inner male coupling element which is axially bidirectionally slidable in the axial bore, and means for maintaining said inner male coupling element in selected alignment during coupling of the male connector and female connector, said outer male coupling distal portion comprising transversely protruding at least one tang element thereon, and a manually securable locking member; and a female connector comprising a housing defining a cavity therein, wherein the cavity contains an enclosing wall member defining a first cavity compartment therewithin, and a second cavity compartment exterior to the enclosing wall member within the cavity, said first cavity compartment being of a size and shape to couplingly receive said inner male coupling element therein, and said second cavity compartment (i) being of a size and shape to couplingly receive said outer male coupling distal portion therein, (ii) including guide stop means for aligning the male and female connectors during coupling thereof and upon insertion of the male connector into the female connector, limiting the rotation of the male connector relative to the female connector, and (iii) including means for securing the male connector in the female connector in a final coupled position;

the male connector and female connector being engageably positionable with the inner male coupling element axially inserted into the first cavity compartment, and the outer male coupling distal portion axially inserted into the second cavity compartment, so that upon subsequent rotation of the male connector relative to the female connector, the at least one tang element engages the guide stop means, to permit the manually securable locking member to be manually secured to abuttingly engage the tang element(s) and the means for securing the male connector in the female connector in a final coupled position.

12. A dispenser assembly according to claim 11, wherein the actuator section comprises the female connector, and the dispenser section comprises the male connector.

13. A dispenser assembly according to claim 11, wherein the actuator and dispenser sections when interconnected to one another by the matable connector assembly structure are coaxially aligned with one another.

14. A dispenser assembly according to claim 11, wherein:

the actuator section comprises a selectively motively actuatable and reciprocatable piston;

the dispenser section comprises: a feed cavity within the male connector housing thereof; a fluid inlet passage in the male connector housing in flow communication with the feed cavity; a fluid outlet passage in the male connector housing in flow communication with the feed cavity; and a valve element mounted in the fluid outlet passage, and coupled with the piston in the actuator section for selected opening and closure of the fluid outlet passage to fluid flow therethrough in response to selective motive actuation of the reciprocatable piston.

15. A dispenser assembly according to claim 14, wherein said fluid inlet passage is joined to fluid supply means for delivery of said fluid under pressure into said feed cavity, for selective dispensing of said fluid to a predetermined fluid application locus.

16. A dispenser assembly according to claim 14, wherein the actuator section further comprises selective adjustment means for adjusting the travel path length of the piston therein.

17. A dispenser assembly according to claim 11, wherein the housing of each of the male connector and the female connector have a generally cylindrical shape.

18. A dispenser assembly according to claim 17, wherein the axial bore of the male connector has a circular transverse cross-section.

19. A dispenser assembly according to claim 18, wherein the enclosing wall member of the female connector is of cylindrical shape, and the second cavity compartment is of cylindrical annular shape.

20. A dispenser assembly according to claim 11, wherein the male connector housing comprises an exterior surface portion having engagement threading thereon, and wherein the manually securable locking member of the male connector comprises a cylindrical locking ring which is threadably engageable with the engagement threading on the exterior surface portion of the male connector housing, and manually tightenable into abutting contact with the female connector to interlockingly connect the male and female connectors.

* * * * *